United States Patent
Li et al.

(10) Patent No.: US 11,082,411 B2
(45) Date of Patent: Aug. 3, 2021

(54) RDMA-BASED DATA TRANSMISSION METHOD, NETWORK INTERFACE CARD, SERVER AND MEDIUM

(71) Applicant: ADVANCED NEW TECHNOLOGIES CO., LTD., Grand Cayman (KY)

(72) Inventors: Changqing Li, Hangzhou (CN); Yinchao Zou, Hangzhou (CN); Changhua He, Hangzhou (CN); Peng Wu, Hangzhou (CN); Jincan Kong, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/822,463

(22) Filed: Mar. 18, 2020

(65) Prior Publication Data
US 2020/0236089 A1    Jul. 23, 2020

Related U.S. Application Data

(63) Continuation of application No. PCT/CN2020/072047, filed on Jan. 14, 2020.

(30) Foreign Application Priority Data

Aug. 6, 2019    (CN) .......................... 201910721776.5

(51) Int. Cl.
*H04L 29/06*    (2006.01)
*G06F 21/60*    (2013.01)
(Continued)

(52) U.S. Cl.
CPC .......... *H04L 63/0428* (2013.01); *G06F 3/067* (2013.01); *G06F 15/17331* (2013.01); *G06F 21/602* (2013.01); *H04L 67/1097* (2013.01)

(58) Field of Classification Search
CPC .. G06F 3/067; G06F 15/17331; G06F 21/602; H04L 67/1097; H04L 63/0428
See application file for complete search history.

(56) References Cited

U.S. PATENT DOCUMENTS

| | | | |
|---|---|---|---|
| 6,408,347 | B1 | 6/2002 | Smith et al. |
| 6,744,765 | B1 | 6/2004 | Dearth et al. |

(Continued)

FOREIGN PATENT DOCUMENTS

| | | |
|---|---|---|
| CN | 108616348 A | 10/2018 |
| CN | 108768669 A | 11/2018 |

(Continued)

OTHER PUBLICATIONS

First Search for Chinese Application No. 201910721776.5 dated Apr. 14, 2020.

(Continued)

*Primary Examiner* — Jeremy S Duffield

(57) ABSTRACT

A Remote Direct Memory Access (RDMA) based data transmission method is disclosed. In this method, an RDMA network interface card is used to encrypt data to improve the security of data transmission. In addition, the data encryption and decryption operation is implemented inside the RDMA network interface card and is transparent to software, thereby ensuring security without adversely affecting performance of an application program.

20 Claims, 4 Drawing Sheets

(51) Int. Cl.
  *G06F 15/173* (2006.01)
  *G06F 3/06* (2006.01)
  *H04L 29/08* (2006.01)

(56) References Cited

U.S. PATENT DOCUMENTS

| | | | |
|---|---|---|---|
| 7,152,122 | B2 | 12/2006 | Kagan et al. |
| 7,245,627 | B2 | 7/2007 | Goldenberg et al. |
| 7,620,693 | B1 | 11/2009 | Mott et al. |
| 7,813,369 | B2 | 10/2010 | Blackmore et al. |
| 7,817,634 | B2 | 10/2010 | Coffman et al. |
| 7,953,085 | B2 | 5/2011 | Chang et al. |
| 8,095,763 | B2 | 1/2012 | Piszczek et al. |
| 8,233,380 | B2 | 7/2012 | Subramanian et al. |
| 8,458,280 | B2 | 6/2013 | Hausauer et al. |
| 8,510,265 | B1 | 8/2013 | Boone et al. |
| 8,595,385 | B1 | 11/2013 | Shapiro et al. |
| 9,529,542 | B2 | 12/2016 | Friedman et al. |
| 10,146,702 | B2 | 12/2018 | Wu et al. |
| 10,212,138 | B1 | 2/2019 | Diamant et al. |
| 2004/0010612 | A1* | 1/2004 | Pandya ............... H04L 67/1097 709/230 |
| 2004/0064688 | A1* | 4/2004 | Jacobs ................ H04L 63/0245 713/150 |
| 2006/0101185 | A1 | 5/2006 | Kapoor et al. |
| 2006/0155880 | A1* | 7/2006 | Elnozahy ............. H04L 49/351 710/1 |
| 2006/0294234 | A1 | 12/2006 | Bakke et al. |
| 2008/0002578 | A1 | 1/2008 | Coffman et al. |
| 2010/0332401 | A1* | 12/2010 | Prahlad ............... H04L 67/1095 705/80 |
| 2014/0289447 | A9 | 9/2014 | Flynn et al. |
| 2016/0315762 | A1* | 10/2016 | Moon .................... H04L 9/065 |
| 2016/0378530 | A1* | 12/2016 | Ramasubramanian ..................... G06F 9/45558 718/1 |
| 2017/0054697 | A1* | 2/2017 | Zhang ................ H04N 21/4405 |
| 2018/0063159 | A1* | 3/2018 | Naughton-Green ...... H04L 9/08 |
| 2019/0102568 | A1* | 4/2019 | Hausauer ............ H04L 63/0428 |
| 2019/0327089 | A1 | 10/2019 | Liu et al. |

FOREIGN PATENT DOCUMENTS

| | | |
|---|---|---|
| CN | 109274647 A | 1/2019 |
| CN | 109450937 A | 3/2019 |
| CN | 110620762 A | 12/2019 |

OTHER PUBLICATIONS

First Office Action for Chinese Application No. 201910721776.5 dated Apr. 22, 2020.
Second Office Action for Chinese Application No. 201910721776.5 dated Jul. 15, 2020.
Written Opinion and International Search Report for PCT Application No. PCT/CN2020/072047 dated Mar. 17, 2020.

* cited by examiner

RDMA-BASED DATA TRANSMISSION METHOD, NETWORK INTERFACE CARD, SERVER AND MEDIUM

CROSS-REFERENCE TO RELATED APPLICATION

This application is a continuation application of International Patent Application No. PCT/CN2020/072047, filed on Jan. 14, 2020, which is based on and claims priority of the Chinese Patent Application No. 201910721776.5, filed on Aug. 6, 2019 and entitled "RDMA-BASED DATA TRANSMISSION METHOD, NETWORK INTERFACE CARD, SERVER AND MEDIUM." The above-referenced applications are incorporated herein by reference in their entirety.

TECHNICAL FIELD

The present specification relates to the field of communications technologies, and more specifically, to a Remote Direct Memory Access (RDMA)-based data transmission method, an RDMA network interface card, a server, and a computer-readable storage medium.

BACKGROUND

RDMA is a high-performance data communications technology. Through RDMA, data can be quickly transmitted from the memory of a system directly to the memory of another remote system without involving an operating system or a Central Processing Unit (CPU). Therefore, compared with a conventional Transmission Control Protocol (TCP) transmission mode, RDMA technology requires less CPU processing power in the data transmission process, saves memory bandwidth and CPU cycles, and improves system processing performance. RDMA has the features of high bandwidth, low latency, and low CPU utilization.

SUMMARY

The present specification provides an RDMA-based data transmission method, an RDMA network interface card, a server, and a readable storage medium.

A first aspect of this specification is directed to an RDMA-based data transmission method. The method may include: acquiring, by a sending-end RDMA network interface card, raw data, determining an encryption algorithm, and encrypting the raw data using the encryption algorithm to generate encrypted data; encapsulating the encrypted data into a data packet, wherein a header of the data packet may include an identifier for the encryption algorithm; and sending, by the sending-end RDMA network interface card, the data packet to a receiving-end RDMA network interface card.

A second aspect of this specification is directed to an RDMA network interface card. The RDMA network interface card may include an acquisition unit, an encryption unit, an encapsulation unit, and a sending unit.

The acquisition unit may be configured to acquire raw data and determine an encryption algorithm. The encryption unit may be configured to encrypt the raw data using the encryption algorithm to generate encrypted data. The encapsulation unit may be configured to encapsulate the encrypted data into a data packet. A header of the data packet may include an encryption algorithm identifier. The sending unit may be configured to send the data packet to a receiving-end RDMA network interface card.

A third aspect of this specification is directed to an RDMA data transmission system comprising a sending-end RDMA network interface card having a memory configured with instructions executable to acquire raw data, determine an encryption algorithm, and encrypt the raw data using the encryption algorithm to generate encrypted data; encapsulate the encrypted data into a data packet, wherein a header of the data packet comprises an identifier for the encryption algorithm; and send the data packet to a receiving-end RDMA network interface card.

A fourth aspect of this specification is directed to a server, comprising a memory, a processor, and a computer program stored in the memory and executable by the processor. Upon executing the program the processor may perform any of the above-described RDMA-based data transmission methods.

A fifth aspect of this specification is directed to a non-transitory computer-readable storage medium having instruction stored thereon. Upon being executed by a processor, the instructions may cause the processor to perform any of the above-described RDMA-based data transmission methods.

The embodiments of this description have the following beneficial effects.

In the RDMA-based data transmission method of this specification, an RDMA network interface card is used to encrypt data to improve the security of data transmission. In addition, the data encryption and decryption operation may be implemented inside the RDMA network interface card (i.e., within the hardware), and is transparent to software, thereby ensuring data security without adversely affecting performance of an application program.

DETAIL DESCRIPTION OF THE EMBODIMENTS

In order to better illustrate the above-described technical solutions, the technical solutions of the embodiments of this specification are described in detail below in combination with the accompanying drawings and specific embodiments. It should be understood that the embodiments of this specification and specific features in the embodiments are detailed descriptions of the technical solutions of the embodiments of this specification, rather than limiting the technical solutions of this specification. The embodiments of this specification and the technical characteristics of the embodiments can be mutually combined without conflictions.

RDMA technologies are attracting increasingly enthusiastic attention in modern enterprise-level data centers, and have been adopted in more and more applications. In an actual application, in addition to the network bandwidth and latency performance, the security of network transmission also needs to be properly handled, especially in the case of an online financial system where the network transmission security is of vital importance. To achieve secure RDMA transmission, this specification discloses a secure data transmission method by encrypting an RDMA message.

As a recently-emerged communication technology for data centers, RDMA still has room for improvement in terms of data transmission security. Currently, data encryption in RDMA mainly relies on a CPU to encrypt data first, then an RDMA hardware may acquire and transmit the encrypted data. However, the aforementioned process is complex and is cumbersome to implement, which may offset, to a certain extent, the high performance advantage of RDMA Technology. Therefore, the present invention proposes an RDMA data encryption method to enable an application program to easily and efficiently encrypt and decrypt an RDMA data message.

Figure 1:
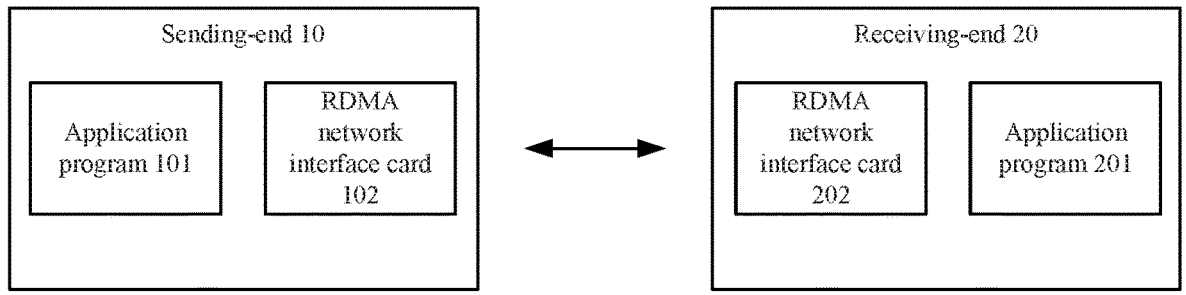
FIG. 1 shows a schematic diagram illustrating an application scenario of an RDMA-based data transmission method according to an embodiment of this specification.

FIG. 1 shows a schematic diagram illustrating an application scenario of an RDMA-based data transmission method according to an embodiment of this specification. A sending-end 10 and a receiving-end 20 are illustrated in FIG. 1. The sending-end and the receiving-end may be two apparatus, which may be, for example, servers or terminal devices. The sending-end 10 may further include an application program 101 and an RDMA network interface card (a sending-end RDMA network interface card) 102, as illustrated in FIG. 1. The receiving-end 20 may further include an application program 201 and an RDMA network interface card (a receiving-end RDMA network interface card) 202, as illustrated in FIG. 1. During data transmission, the application program 101 of the sending-end 10 may initiate a data transmission instruction and send to-be-transmitted raw data to the RDMA network interface card 102. The RDMA network interface card 102 may encapsulate the raw data into a data packet and send the data packet to the RDMA network interface card 202 of the receiving-end 20 by using an RDMA network. The RDMA network interface card 202 may split the received data packet to obtain the raw data and eventually provide the raw data to the application program 201. To improve data transmission security, the RDMA network interface card 102 of the sending-end 10 may need to encrypt the raw data before encapsulating the raw data, encapsulate the encrypted data into the data packet, and send the data packet to the RDMA network interface card 202 of the receiving-end 20. Thus, the data transmitted over the RDMA network is encrypted, and therefore its content will be safeguarded even in the case the transmission is intercepted.

Figure 2:
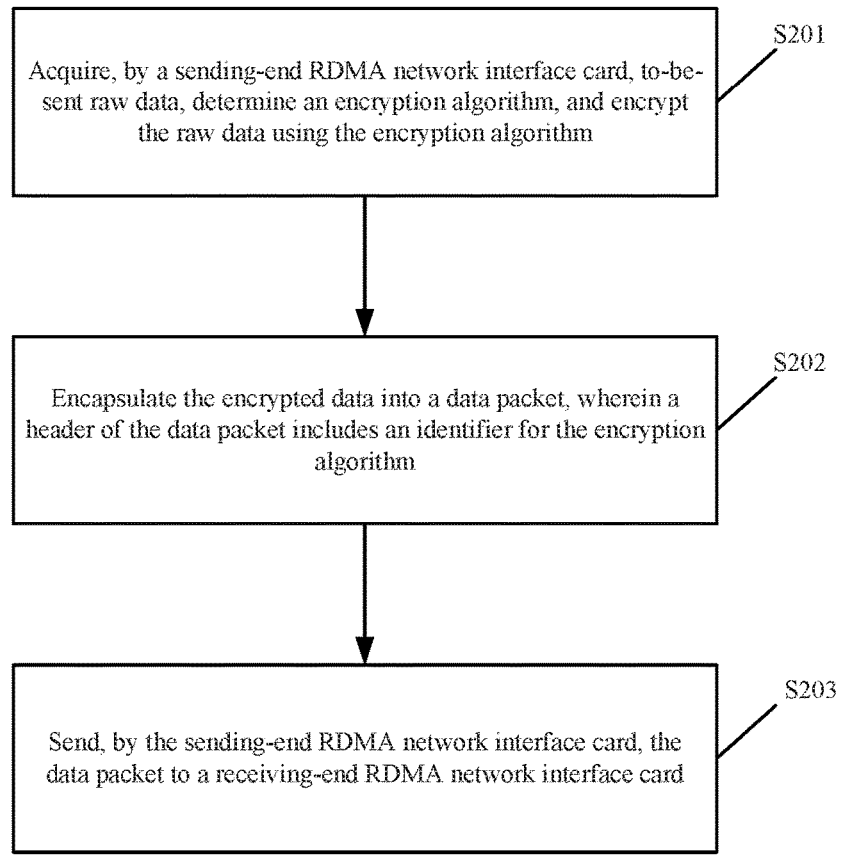
FIG. 2 shows a flow chart illustrating an RDMA-based data transmission method according to one aspect of this specification.

According to a first aspect of this specification, an RDMA-based data transmission method is disclosed. Referring to FIG. 2, the method may include the following steps S201 through S203.

In step S201, to-be-sent raw data may be acquired by a sending-end RDMA network interface, an encryption algorithm may be determined, and the raw data may be encrypted using the encryption algorithm.

In some embodiments, the sending-end RDMA network interface card may acquire the raw data and an encryption instruction from a sending-end application program. For example, the sending-end application program may call an RDMA application interface Verbs API to send a data sending instruction and the encryption instruction to the RDMA network interface card.

The Verbs API may be a dynamic link library used for providing access methods to a hardware (e.g., RDMA network interface card).

The data sending instruction may include the to-be-sent raw data, which may be to-be-sent user data, and may also be referred to as a message. A message is a data unit exchanged and transmitted over a network (i.e., a data block that needs to be sent at a time). A message may include entire to-be-sent data information and may vary in length. The length of a message may not be limited and may be customizable.

The encryption instruction may be used to indicate, to the RDMA network interface card, the encryption algorithm to be used to encrypt the raw data. The encryption method may be various existing or custom algorithms, including but not limited to Advanced Encryption Standard (AES), Data Encryption Standard (DES), Digital Signature Algorithm (DSA), MD5 Message-Digest Algorithm (MD5), Secure Hash Algorithm (SHA), which is not limited by the embodiments of this specification.

Additionally, other than the above-described example in which an encryption method is determined by the application program issuing the encryption instruction to the RDMA network interface card, the encryption method may alternatively be determined by the RDMA network interface card. For example, one or more encryption methods may be used by default in factory settings of the RDMA network interface card, or the RDMA network interface card may be programmed to determine the encryption method to be used.

In step S202, the encrypted data may be encapsulated into a data packet. A header of the data packet may include an identifier for the encryption algorithm (i.e., the encryption algorithm identifier).

After receiving the raw data, the RDMA network interface card may need to encapsulate the raw data, so as to obtain, through the encapsulation, a data packet that includes sending-end and receiving-end address information. The data packet may be transmitted over one or more networks along different paths.

Figure 3:
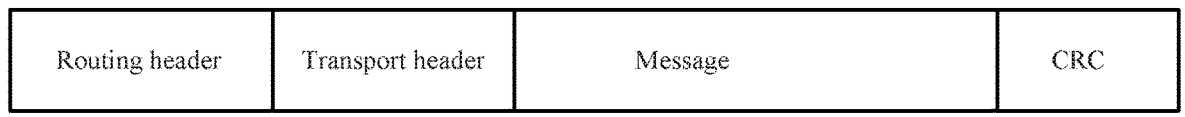
FIG. 3 shows a structural schematic diagram illustrating a data message in an RDMA-based data transmission method according to one aspect of this specification.

FIG. 3 shows a structural schematic diagram illustrating an RDMA data packet. The RDMA data packet may include four parts: a Routing Header, a Transport Header, a message (Packet Payload), and a Cyclic Redundancy Check (CRC).

The Routing Header may include routing information from a sending-end to a receiving-end.

The Transport Header may include a field for transmission using an InfiniBand Architecture (IBA) and meets a standard of the InfiniBand Trade Association (IBTA, which has established all InfiniB and standards and explained features and behaviors inherent to an RDMA transmission process) protocol. According to the IB TA protocol, the Transport Header may include one or more reserved bits (a placeholder).

The Packet Payload may be a message, which may also be understood as raw data, user data, or a payload of the data packet.

The CRC may be a hash function for generating a short check code with a fixed quantity of bits according to the data, and may be used to detect or check errors that may occur during data transmission or storage using a principle of division and remainder.

The sending-end RDMA network interface card may encrypt the raw data before encapsulating the encrypted data into the data packet. Therefore, the encrypted data may be encapsulated into the data packet. In addition, to allow the receiving-end to learn the encryption method, the encryption algorithm identifier may need to be included in the data packet.

In some embodiments, the reserved bits in the Transport Header of the data packet may be used to represent the encryption algorithm identifier. Doing so does not require a change to a structure of the data packet, and thus can be easily implemented.

In some embodiments, by redefining a data packet protocol, and one or more non-reserved bits may be used to present the encryption algorithm identifier. For example, a custom field may be added to the Routing Header or the Transport Header of the data packet to represent the encryption algorithm identifier.

By adding, through the sending-end RDMA network interface card, the encryption algorithm identifier to the data packet, the receiving-end may determine, upon acquiring the above-described encryption algorithm identifier (assuming not entirely Os) by parsing the data packet, that the data in the data packet has been encrypted. Therefore, the encryption algorithm identifier alone is sufficient to convey the receiving-end the fact that the data in the data packet has been encrypted. Certainly, an additional encryption representation identifier may also be added at the sending-end. The encryption representation identifier may be used to indicate whether the data in the data packet has been encrypted. Further, the encryption algorithm identifier may be used to indicate the specific encryption algorithm used. In this case, after parsing the data packet, the receiving-end RDMA network interface card may first determine, according to the encryption representation identifier, whether the data in the data packet has been encrypted. In case the data has been encrypted, the receiving-end RDMA network interface card may learn the encryption algorithm according to the encryption algorithm identifier, and then determine a decryption algorithm corresponding to the encryption algorithm. Similar to the above-described manner for representing the encryption algorithm identifier, one or more reserved bits in the Transport Header of the data packet may be used to represent the encryption representation identifier. Alternatively, a custom field may be added to the Routing Header or the Transport Header of the data packet to represent the encryption representation identifier.

In step S203, the data packet may be sent to the receiving-end RDMA network interface card.

The sending-end RDMA network interface card may transmit the encapsulated data packet to the receiving-end RDMA network interface card using an RDMA network. The message in the data packet may be encrypted, therefore the content of the data packet is safeguarded even in the case the transmission is loss or intercepted. Thus, the data security can be strengthened to the greatest extent in the data transmission process.

After receiving the data packet, the receiving-end RDMA network interface card may need to parse the data packet and decrypt the encrypted data. First, the receiving-end RDMA network interface card may parse the received data packet to obtain the encrypted data and the header. Then it may determine, according to the encryption algorithm identifier in the header, a decryption algorithm corresponding to the encryption algorithm. The encrypted data may be decrypted using the decryption algorithm, and the raw data may be obtained.

For ease of description, the decryption method corresponding to an encryption method may be referred to as a decryption algorithm. In actual applications, some encryption methods do not differentiate an encryption algorithm and a decryption algorithm, and both may be represented by a unified algorithm name. In view of this, it should be appreciated that the foregoing descriptions should not be construed as limiting the embodiments of this specification.

Figure 4:
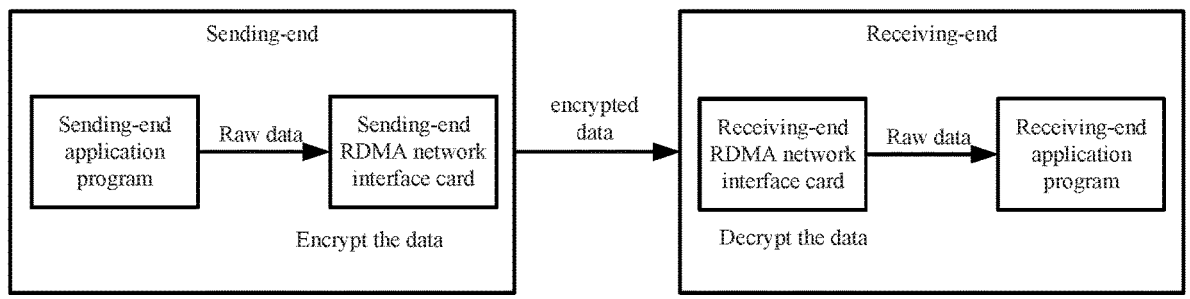
FIG. 4 is a schematic diagram illustrating processing at a sending-end and a receiving-end in an RDMA-based data transmission method according to one aspect of this specification.

FIG. 4 shows a schematic diagram illustrating the processing at the sending-end and the receiving-end in the RDMA-based data transmission method according to one aspect of this specification. The entire data processing process may include the following steps. First, the sending-end application program may send the raw data to the sending-end RDMA network interface card. Then, the sending-end RDMA network interface card may encrypt the raw data, encapsulate the encrypted data into the data packet, and send the encrypted data packet to the receiving-end RDMA network interface card. Next, the receiving-end RDMA network interface card may split and decrypt the data packet to obtain the raw data. Finally, the receiving-end RDMA network interface card may provide the raw data to a receiving-end application program. Thus, the entire data encryption and decryption operation may be implemented inside the RDMA network interface card (i.e., completed within the hardware), and is transparent to software. This ensures the data security without adversely affecting performance of an application program.

Those skilled in the art are aware that RDMA has long been a dedicated technology in the field of High Performance Computing (HPC). Although high performance computing rarely has an encryption/decryption requirement, RDMA, on the other hand, can be applied to online financing and may play a vital role for the security of data transmission.

Conventionally, a chip with an encryption/decryption function is usually a dedicated chip not integrated into a network chip. In an exemplary scenario, to achieve an encryption/decryption function for network transmission, one method is to combine an encryption/decryption chip with a network chip. In that case, an application program needs to call both the encryption/decryption chip and the network chip (e.g., an RDMA network interface card) at the same time. Therefore, implementing encrypted data transmission by combining two types of chips may result in a complex system with poor compatibility. In the embodiments of this specification, data encryption/decryption may be implemented inside the RDMA network interface card so that the network interface card has both transmission and encryption/decryption functions. In addition, the data encryption/decryption is implemented inside the chip and is transparent to software. This ensures the data security without adversely affecting the performance of an application program.

Figure 5:
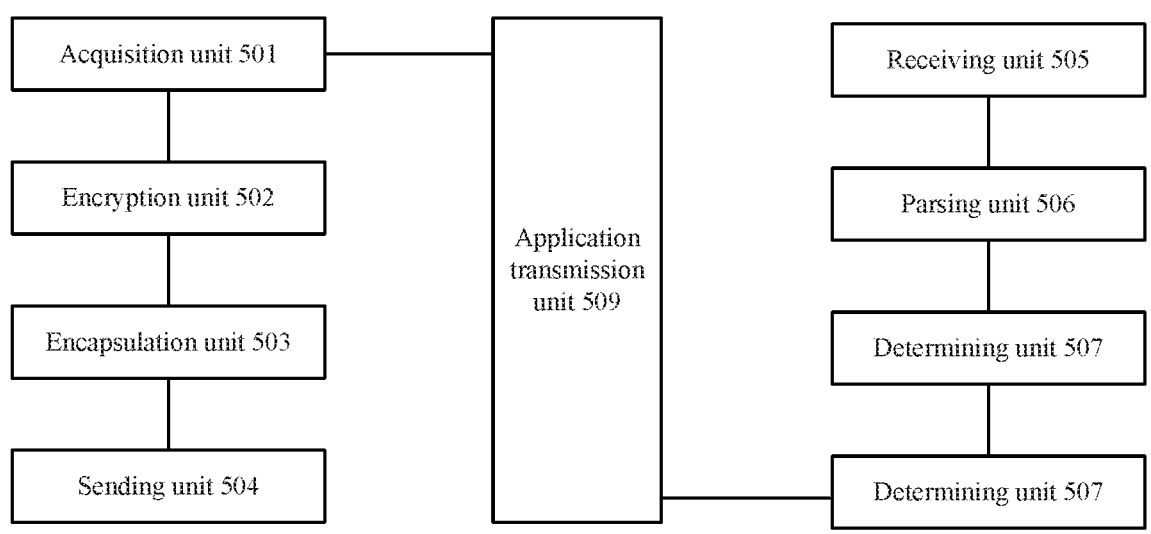
FIG. 5 shows a block diagram illustrating an RDMA network interface card according to one aspect of this specification.

According to another aspect of this specification, based on the same inventive concept as the RDMA-based data transmission method, an RDMA network interface card is disclosed. Referring to FIG. 5, the RDMA network interface card may include an acquisition unit 501, an encryption unit 502, an encapsulation unit 503, and a sending unit 504.

The acquisition unit 501 may be configured to acquire to-be-sent raw data and determine an encryption algorithm. The encryption unit 502 may be configured to encrypt the raw data using the encryption algorithm to generate encrypted data. The encapsulation unit 503 may be configured to encapsulate the encrypted data into a data packet. A header of the data packet may include an identifier for the encryption algorithm (i.e., the encryption algorithm identifier). The sending unit 504 may be configured to send the data packet to a receiving-end RDMA network interface card.

In some embodiments, the RDMA network interface card may further include a receiving unit 505, a parsing unit 506, a determining unit 507, and a decryption unit 508.

The receiving unit 505 may be configured to receive the data packet. The parsing unit 506 may be configured to parse the received data packet, so as to obtain the encrypted data and the header. The determining unit 507 may be configured to determine, according to the encryption algorithm identifier in the header, a decryption algorithm corresponding to the encryption algorithm. The decryption unit 508 may be configured to decrypt the encrypted data using the decryption algorithm, so as to obtain the raw data.

In some embodiments, the header of the data packet may further include an encryption representation identifier. The determining unit 507 may be configured to: first determine, according to the encryption representation identifier, whether the data in the data packet is encrypted; and, in response to a determination that the data in the data packet has been encrypted, determine the decryption algorithm according to the encryption algorithm identifier.

In some embodiments, the encapsulation unit 503 may be configured to: use one or more reserved bits in a transport header of the data packet to represent the encryption representation identifier and the encryption algorithm identifier, or add a custom field to a routing header or a transport header of the data packet and use the custom field to represent the encryption representation identifier and the encryption algorithm identifier.

In some embodiments, the RDMA network interface card may further include an application transmission unit 509, configured to receive the raw data and an encryption instruction sent by a sending-end RDMA application program by calling an RDMA application interface. The acquisition unit 501 may receive the raw data and the encryption instruction, and determine the encryption algorithm according to the encryption instruction.

It can be understood that the application transmission unit 509 at a receiving-end may be further configured to provide the raw data obtained through decryption to an application program.

According to another aspect of this specification, based on the inventive concept of the RDMA-based data transmission method in the foregoing embodiments, this specification provides an RDMA data transmission system comprising a sending-end apparatus and a receiving-end apparatus. The sending-end apparatus may include a sending-end RDMA network interface card, and the receiving-end apparatus may include a receiving-end RDMA network interface card.

The sending-end RDMA network interface card may be configured to: acquire raw data, determine an encryption algorithm, and encrypt the raw data using the encryption algorithm to generate encrypted data; encapsulate the encrypted data into a data packet, wherein a header of the data packet may comprise an identifier for the encryption algorithm; and send the data packet to the receiving-end RDMA network interface card.

In the aforementioned system, the data packet may further include: a routing header including routing information from a sending-end to a receiving-end; a transport header including one or more reserved bits; and a packet payload representing the encrypted data.

In the aforementioned system, to determine an encryption algorithm, the sending-end RDMA network interface card may be configured to determine, according to an encryption instruction received by the sending-end RDMA network interface card, the encryption algorithm.

In the aforementioned system, the receiving-end RDMA network interface card may be configured to: parse the received data packet to obtain the encrypted data and the header; determine, according to the identifier for the encryption algorithm in the header, a decryption algorithm corresponding to the encryption algorithm; and decrypt, using the decryption algorithm and by the receiving-end RDMA interface card, the encrypted data to obtain the raw data.

In the aforementioned system, the header of the data packet may further include an encryption indicator identifier. The receiving-end RDMA network interface card may be further configured to: after parsing the received data packet, determine, according to the encryption indicator identifier, whether data in the data packet is encrypted; and in response to determining that the data in the data packet is encrypted, determine, according to the identifier for the encryption algorithm, the decryption algorithm corresponding to the encryption algorithm.

In the aforementioned system, the sending-end RDMA network interface card may be further configured to: use reserved bits in a transport header of the data packet to represent the encryption indicator identifier and the identifier for the encryption algorithm; or add a custom field to a routing header or the transport header of the data packet. The custom field may be used to represent the encryption indicator identifier and the identifier for the encryption algorithm.

In the aforementioned system, to acquire raw data, and determine an encryption algorithm, the sending-end RDMA network interface card may be further configured to: receive the raw data and an encryption instruction; and determine, according to the encryption instruction, the encryption algorithm. The raw data and the encryption instruction may be sent by a sending-end RDMA application program through calling an RDMA application interface.

Figure 6:
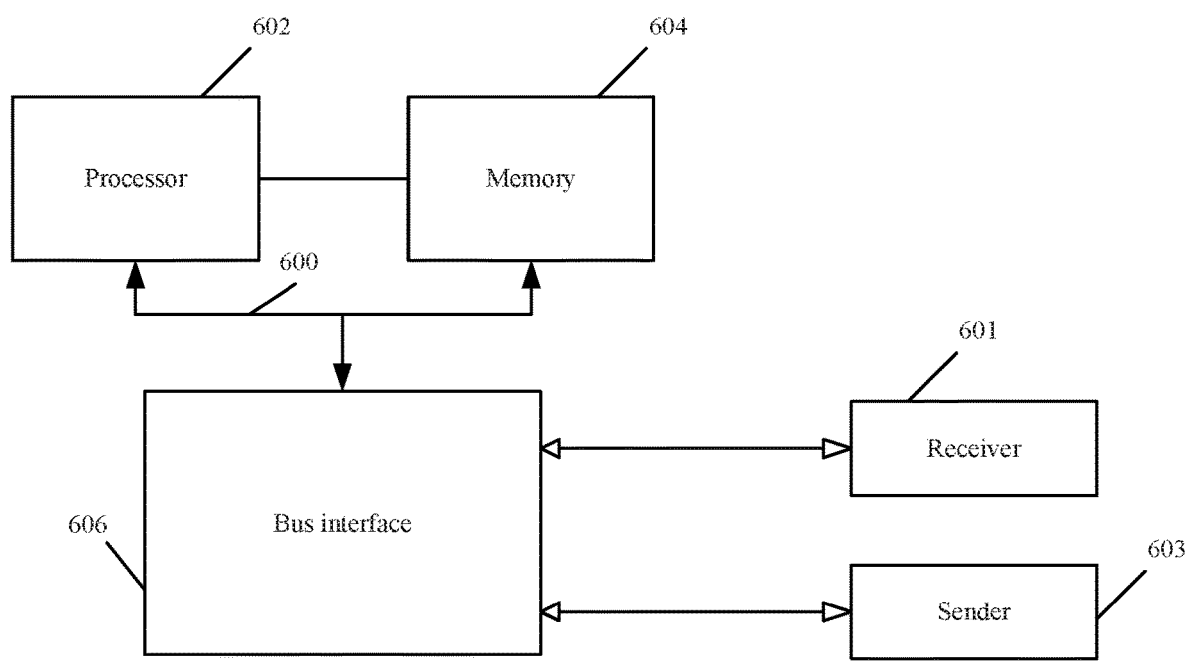
FIG. 6 shows a structural schematic diagram illustrating a server according to one aspect of this specification.

According to another aspect of this specification, based on the inventive concept of the RDMA-based data transmission method in the foregoing embodiments, the present invention further provides a server, as shown in FIG. 6. The server may include a memory 604, a processor 602, and a computer program stored in the memory 604 and executable on the processor 602. Upon executing the program, the processor 602 may perform any of the above-described RDMA-based data transmission methods.

Referring to FIG. 6, a bus architecture may be represented by a bus 600. The bus 600 may include any number of interconnected buses and bridges, and may link together various circuits of one or more processors represented by the processor 602 and a memory represented by the memory 604. The bus 600 may further link together various other circuits such as a peripheral device circuit, a voltage stabilizer circuit, and a power management circuit, which are commonly known in the art and are not described further herein. A bus interface 606 may provide an interface among the bus 600, a receiver 601, and a sender 603. The receiver 601 and the sender 603 may be the same element, namely a transceiver, to act as a unit for communicating with various other apparatuses on a transmission medium. The processor 602 may be responsible for managing the bus 600 and general processing, and the memory 604 may be used to store data used by the processor 602 when performing operations.

According to another aspect of this specification, based on the inventive concept of the RDMA-based data transmission method in the foregoing embodiments, the present invention further provides a non-transitory computer readable storage medium with a computer program stored thereon. Upon being executed by a processor, the computer program may cause the processor to perform any of the above-described RDMA-based data transmission methods.

The present specification is described with reference to the flow charts and/or block diagrams of the method, device (system), and computer program product according to the embodiments of this specification. It should be understood that each flow and/or block in the flow charts and/or the block diagrams, and a combination of the flows and/or the blocks in the flow charts and/or the block diagrams can be implemented via computer program instructions. The computer program instructions may also be loaded onto a general-purpose computer, a specialized computer, an embedded processor, or the processors of other programmable data processing devices to produce a computer such that the instructions which are executed on the computer or other processors of the programmable apparatus generate a device for implementing the functions specified in one or more flows in a flow chart and/or one or more blocks in a block diagram.

The computer program instructions can also be stored in a computer readable memory which can boot a computer or other programmable data processing devices to operate in a specific manner, such that the instructions stored in the computer readable memory generate a product comprising an instruction apparatus, wherein the instruction apparatus is configured to realize the functions specified in one or more flows in a flow chart and/or one or more blocks in a block diagram.

The computer program instructions can also be loaded to a computer or other programmable data processing devices, so as to execute a series of operation steps on the computer or the other programmable devices to generate a computer reliable process, such that the instructions executed on the computer or the other programmable devices can provide steps for implementing the functions specified in one or more flows in a flow chart and/or one or more blocks in a block diagram.

Although preferred embodiments of this specification have been described, those skilled in the art may make other changes and modifications to these embodiments once they know a basic inventive concept. Therefore, the attached claims are intended to be interpreted to include the preferred embodiments, and all changes and modifications which fall within the scope of this specification.

Obviously, those skilled in the art may make various modifications and variations to this specification without departing from the spirit and scope of this specification. In this way, if these modifications and variations of this specification fall within the scope of the claims of this specification and their equivalent technologies, this specification is also intended to include these modifications and variations.

The invention claimed is:

1. A Remote Direct Memory Access (RDMA)-based data transmission method, comprising:
    acquiring, by a sending-end RDMA network interface card, raw data;
    determining, based on an encryption instruction from a sending-end RDMA application program, an encryption algorithm;
    encrypting the raw data using the encryption algorithm to generate encrypted data;
    encapsulating the encrypted data into a data packet, wherein a header of the data packet comprises an identifier for the encryption algorithm and an encryption indicator identifier,
        wherein the header includes a routing header having routing information from a sending-end device to a receiving-end device for the data packet, and a transport header having reserved bits of InfiniBand Architecture protocol, wherein the identifier for the encryption algorithm and the encryption indicator identifier are indicated in the reserved bits, and
        wherein the encryption indicator identifier indicates whether the data packet is encrypted and the identifier for the encryption algorithm indicates a specific encryption algorithm used to encrypt the raw data; and
    sending, by the sending-end RDMA network interface card, the data packet to a receiving-end RDMA network interface card.

2. The method of claim 1, wherein the data packet further comprises:
    a packet payload representing the encrypted data.

3. The method of claim 1, further comprising:
    parsing, by the receiving-end RDMA network interface card, the received data packet to obtain the encrypted data and the header;
    determining, according to the identifier for the encryption algorithm in the header, a decryption algorithm corresponding to the encryption algorithm; and
    decrypting, using the decryption algorithm and by the receiving-end RDMA network interface card, the encrypted data to obtain the raw data.

4. The method of claim 3,
    wherein the method further comprises: after parsing, by the receiving-end RDMA network interface card, the received data packet,
        determining, according to the encryption indicator identifier, whether data in the data packet is encrypted; and
        in response to determining that the data in the data packet is encrypted, determining, according to the identifier for the encryption algorithm, the decryption algorithm corresponding to the encryption algorithm.

5. The method of claim 1,
    wherein the raw data and the encryption instruction are sent by the sending-end RDMA application program through calling an RDMA application interface.

6. A Remote Direct Memory Access (RDMA) data transmission system comprising a sending-end RDMA network interface card having a memory configured with instructions executable to:
    acquire raw data;
    determine, based on an encryption instruction from a sending-end RDMA application program, an encryption algorithm;
    encrypt the raw data using the encryption algorithm to generate encrypted data;
    encapsulate the encrypted data into a data packet, wherein a header of the data packet comprises an identifier for the encryption algorithm and an encryption indicator identifier,
        wherein the header includes a routing header having routing information from a sending-end device to a receiving-end device for the data packet, and a transport header having reserved bits of InfiniBand Architecture protocol, wherein the identifier for the encryption algorithm and the encryption indicator identifier are indicated in the reserved bits, and wherein the encryption indicator identifier indicates whether the data packet is encrypted and the identifier for the encryption algorithm indicates a specific encryption algorithm used to encrypt the raw data; and send the data packet to a receiving-end RDMA network interface card.

7. The system of claim 6, wherein the data packet further comprises:

a packet payload representing the encrypted data.

8. The system of claim 6, wherein the system further comprises the receiving-end RDMA network interface card having a memory configured with instructions executable to:

parse the received data packet to obtain the encrypted data and the header;

determine, according to the identifier for the encryption algorithm in the header, a decryption algorithm corresponding to the encryption algorithm; and decrypt, using the decryption algorithm, the encrypted data to obtain the raw data.

9. The system of claim 8, wherein the memory of the receiving-end RDMA network interface card is further configured with instructions executable to: after parsing the received data packet, determine, according to the encryption indicator identifier, whether data in the data packet is encrypted; and in response to determining that the data in the data packet is encrypted, determine, according to the identifier for the encryption algorithm, the decryption algorithm corresponding to the encryption algorithm.

10. The system of claim 6, wherein the raw data and the encryption instruction are sent by the sending-end RDMA application program through calling an RDMA application interface.

11. A non-transitory computer-readable storage medium having instructions stored thereon executable by a sending-end Remote Direct Memory Access (RDMA) network interface card to cause the processor sending-end RDMA network interface card to perform operations comprising:

acquiring raw data;

determining, based on an encryption instruction from a sending-end RDMA application program, an encryption algorithm;

encrypting the raw data using the encryption algorithm to generate encrypted data;

encapsulating the encrypted data into a data packet, wherein a header of the data packet comprises an identifier for the encryption algorithm and an encryption indicator identifier, wherein the header includes a routing header having routing information from a sending-end device to a receiving-end device for the data packet, and a transport header having reserved bits of InfiniBand Architecture protocol, wherein the identifier for the encryption algorithm and the encryption indicator identifier are indicated in the reserved bits, and wherein the encryption indicator identifier indicates whether the data packet is encrypted and the identifier for the encryption algorithm indicates a specific encryption algorithm used to encrypt the raw data; and sending the data packet to a receiving-end RDMA network interface card.

12. The storage medium of claim 11, wherein the data packet further comprises:

a packet payload representing encrypted data.

13. The storage medium of claim 11, wherein the instructions are executable by the receiving-end RDMA network interface card to perform:

parsing, by the receiving end RDMA network interface card, the received data packet to obtain the encrypted data and the header;

determining, according to the identifier for the encryption algorithm in the header, a decryption algorithm corresponding to the encryption algorithm; and decrypting, using the decryption algorithm, the encrypted data to obtain the raw data.

14. The storage medium of claim 13, wherein the instructions are executable by the receiving-end RDMA network interface card to perform: after parsing the received data packet, determining, according to the encryption indicator identifier, whether data in the data packet is encrypted; and in response to determining that the data in the data packet is encrypted, determining, according to the identifier for the encryption algorithm, the decryption algorithm corresponding to the encryption algorithm.

15. The storage medium of claim 11, wherein the raw data and the encryption instruction are sent by the sending-end RDMA application program through calling an RDMA application interface.

16. The method of claim 1, wherein the encryption algorithm comprises one of Advanced Encryption Standard, Data Encryption Standard, Digital Signature Algorithm, MD5 Message-Digest Algorithm, or Secure Hash Algorithm.

17. The method of claim 5, wherein the RDMA application interface includes a Verbs application programming interface.

18. The system of claim 6, wherein the encryption algorithm comprises one of Advanced Encryption Standard, Data Encryption Standard, Digital Signature Algorithm, MD5 Message-Digest Algorithm, or Secure Hash Algorithm.

19. The system of claim 10, wherein the RDMA application interface includes a Verbs application programming interface.

20. The storage medium of claim 15, wherein the RDMA application interface includes a Verbs application programming interface.

* * * * *

UNITED STATES PATENT AND TRADEMARK OFFICE
CERTIFICATE OF CORRECTION

| | |
|---|---|
| PATENT NO. | : 11,082,411 B2 |
| APPLICATION NO. | : 16/822463 |
| DATED | : August 3, 2021 |
| INVENTOR(S) | : Changqing Li et al. |

It is certified that error appears in the above-identified patent and that said Letters Patent is hereby corrected as shown below:

In the Claims

In Claim 11, Column 11, Line 41, "cause the processor sending-end RDMA" should read -- cause the sending-end RDMA --.

In Claim 13, Column 12, Lines 15-16, "parsing, by the receiving end RDMA network interface card, the received data packet" should read -- parsing the received data packet --.

Signed and Sealed this
Second Day of May, 2023

Katherine Kelly Vidal
*Director of the United States Patent and Trademark Office*